(12) United States Patent
Chinta

(10) Patent No.: US 8,573,676 B2
(45) Date of Patent: Nov. 5, 2013

(54) CLOSURE ASSEMBLY FOR A VEHICLE

(75) Inventor: Balakrishna Chinta, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/267,172

(22) Filed: Oct. 6, 2011

(65) Prior Publication Data

US 2013/0088038 A1  Apr. 11, 2013

(51) Int. Cl.
*B62D 25/12* (2006.01)

(52) U.S. Cl.
USPC ........................................ 296/76; 296/146.12

(58) Field of Classification Search
USPC ............... 296/76, 136.03, 193.11, 146.11, 296/146.12, 146.13; 180/69.2, 69.21; 46/502; 49/502
See application file for complete search history.

(56) References Cited

U.S. PATENT DOCUMENTS

| | | | | |
|---|---|---|---|---|
| 4,097,958 | A * | 7/1978 | Van Dell | 16/225 |
| 4,291,501 | A * | 9/1981 | Steinberg et al. | 49/386 |
| 4,776,626 | A * | 10/1988 | Seyler | 296/76 |
| 5,516,168 | A * | 5/1996 | Tomaszewski-Link | 292/338 |
| 5,823,606 | A * | 10/1998 | Schenk et al. | 296/107.08 |
| 7,162,775 | B2 * | 1/2007 | Hoffman | 16/366 |
| 2010/0140005 | A1 * | 6/2010 | Kisiler et al. | 180/69.2 |

FOREIGN PATENT DOCUMENTS

EP  1134104 A1 *  9/2001

* cited by examiner

*Primary Examiner* — Jason S Morrow
*Assistant Examiner* — E Turner Hicks

(57) ABSTRACT

A closure assembly for a vehicle includes rails secured to a vehicle body, first joints secured to one of the rails and able to pivot about an axis through a first angle between a first reference position and a second reference position, a panel, and second joints secured to one of the rails, supporting the panel and able to pivot about a second axis through a second angle between a first reference position and a third reference position.

20 Claims, 3 Drawing Sheets

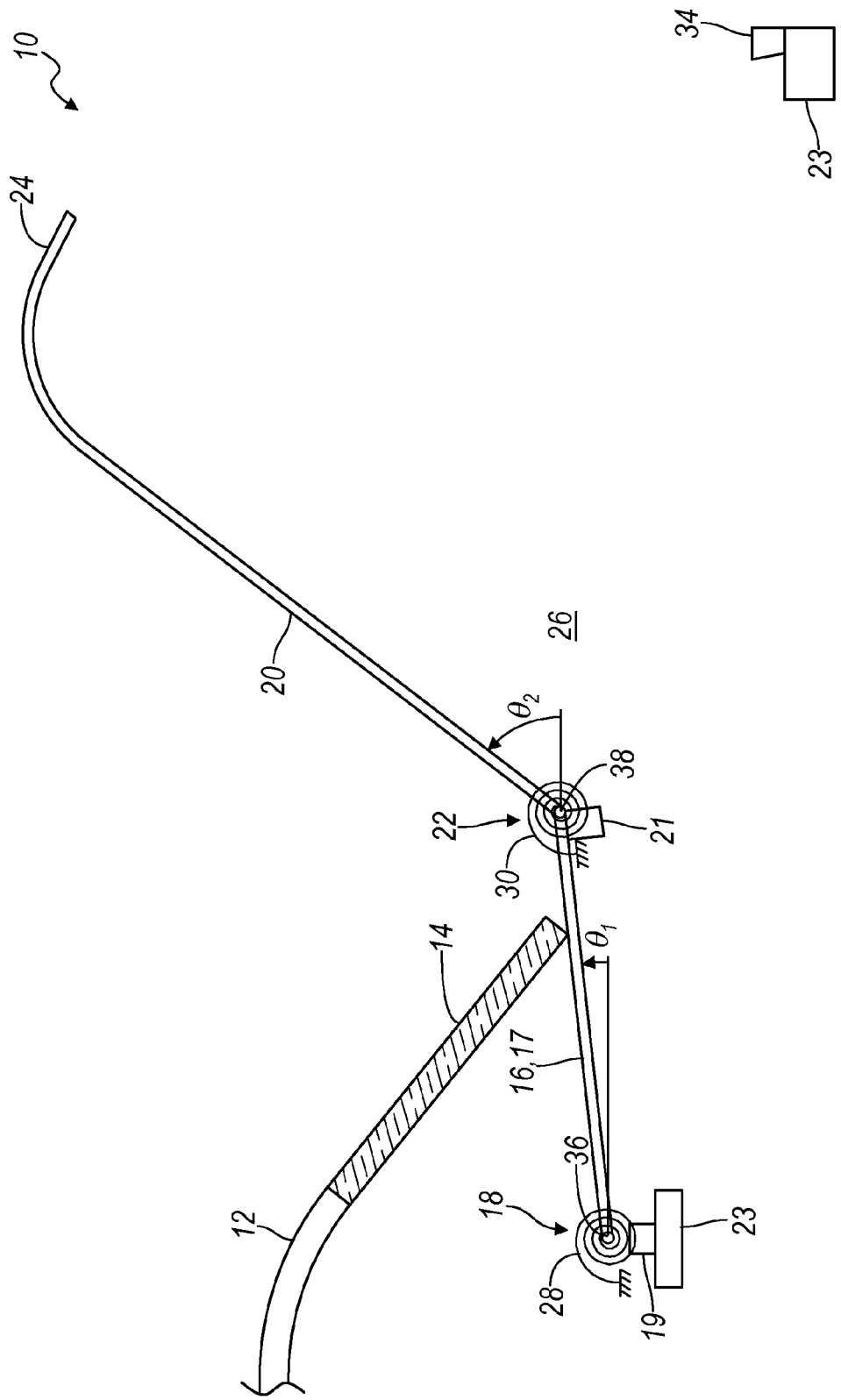

US 8,573,676 B2

CLOSURE ASSEMBLY FOR A VEHICLE

BACKGROUND OF INVENTION

The present invention relates generally to a pivoting rear closure panel for a vehicle, such as a decklid, hatch or trunk lid.

Generally a motor vehicle includes a pivoting rear closure panel, such as decklid, which covers a trunk or luggage compartment at the rear of the vehicle when closed and provides access to the compartment when open. A hinge allows the closure panel to be raised, and a spring or pressurized pneumatic cylinder holds the panel up in the open position.

The hinge supports a goose neck arm having a curved portion that prevents its interference with the vehicle body and rear glass when the closure panel is opened. But that arm can crush the luggage stored in the trunk when the closure panel is closed. Thus, the arm can limit available storage space in the trunk or luggage compartment.

A need exists in the industry for a rear closure panel that avoids interference with the body/rear glass, eliminates the possibility of crushing goods stored in the compartment and avoids occupying space in the compartment.

SUMMARY OF INVENTION

A closure assembly for a vehicle includes rails secured to a vehicle body, first joints secured to one of the rails and able to pivot about an axis through a first angle between a first reference position and a second reference position, a panel, and second joints secured to one of the rails, supporting the panel and able to pivot about a second axis through a second angle between a first reference position and a third reference position.

The closure panel avoids interference with the body and rear glass, eliminates the possibility of crushing goods stored in the luggage compartment, and provides increased storage space in the compartment.

The closure panel can be produced at low cost with two elastically supported torsion hinge joints as compared to a four-bar mechanism with gas struts. The torsion springs are relatively temperature insensitive providing consistent force in winter and summer.

The closure panel potentially reduces weight of a conventional closing mechanism due to its elimination of the curved arm present in a conventional goose neck mechanism.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

BRIEF DESCRIPTION OF DRAWINGS

FIG. 3 is schematic side view showing the rear closure panel fully open.

DETAILED DESCRIPTION

Figure 1:
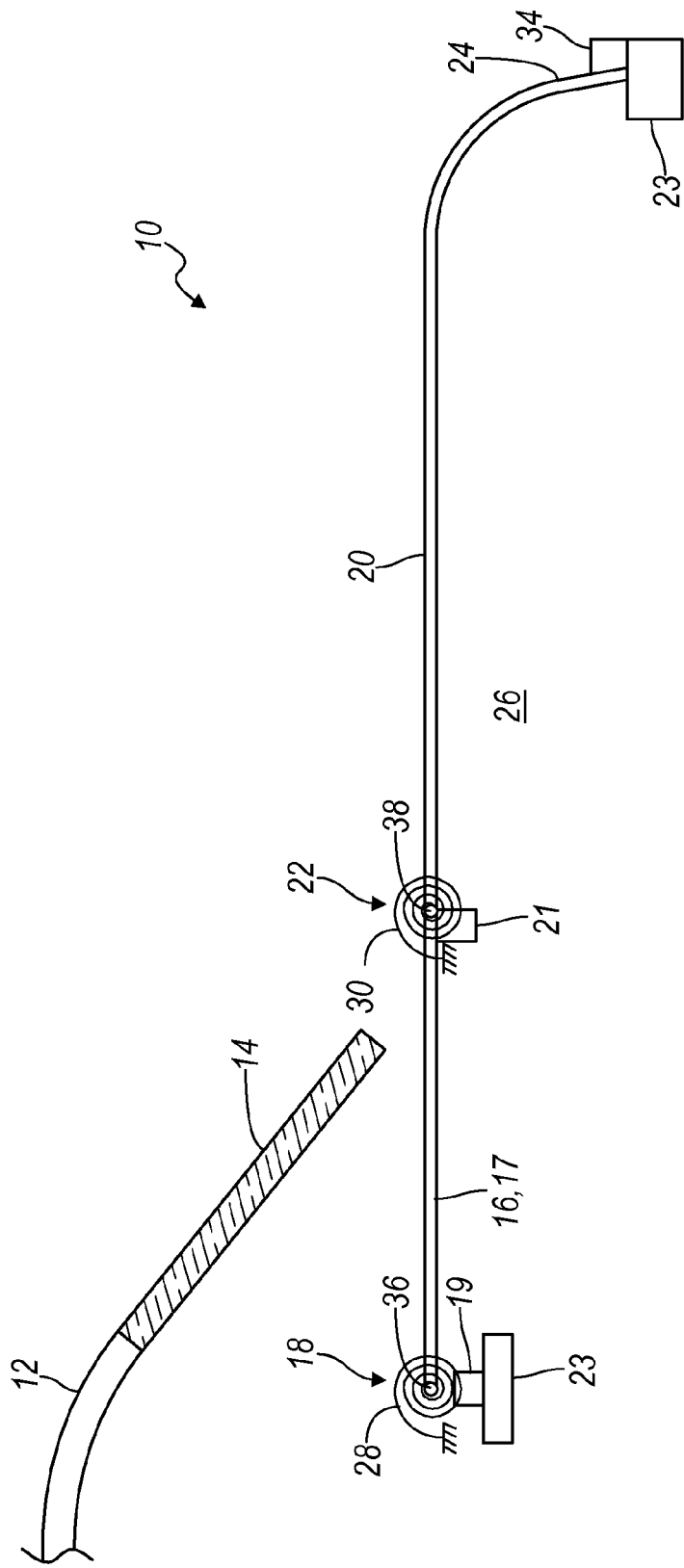
FIG. 1 is a schematic side view showing a rear closure panel for a motor vehicle, the panel being in its closed position.

Referring now to the drawings, there is illustrated in FIG. 1 a rear closure assembly 10 for a motor vehicle, a rear portion of the vehicle's roof 12, and a rear glass panel 14 extending downward and away from the roof 12. The rear closure panel assembly 10 includes two rods or bars 16, 17, one rod 16 located at the left-hand side (near side) of the vehicle compartment 26, the other rod 17 located at the right-hand side (far side), each rod 16, 17 hinged to the body 23 by a front hinge joint 18. The rear closure panel 10 further includes a rear panel 20, rear hinge joints 22, and latch mechanisms 19, 21. The rear panel 20 includes a portion 24 that extends downward, thereby closing the passenger compartment or luggage compartment 26. One of the front latching mechanisms 19 is located at a forward end of each of the rods 16, 17. One of the rear latching mechanisms 21 is located at an aft end of each of the rods 16, 17.

FIG. 1 shows joints 18, 22 without pivotal displacement from a first reference position. Pivotal displacement of joint 18 from the first reference position is resisted by torsion springs 28, each spring 28 located at the forward end of one of the rods 16, 17. Pivotal displacement of joints 22 from the first reference position is resisted by torsion springs 30, each spring 30 located at the aft end of one of the rods 16, 17. The front hinge joints 18 are secured to the vehicle body 23.

When the panel assembly 10 is closed, as shown in FIG. 1, the front hinge joints 18, which connect rods 16, 17 and the body 23, are unlatched by latching mechanisms 19, thereby permitting joints 18 to pivot counterclockwise subject to the restraint of torsion springs 28. When the panel assembly 10 is closed, the rear hinge joints 22, which connect panel 20 and rods 16, 17, are latched by latching mechanisms 21, thereby preventing panel 20 from pivoting relative to rods 16, 17.

Figure 2:
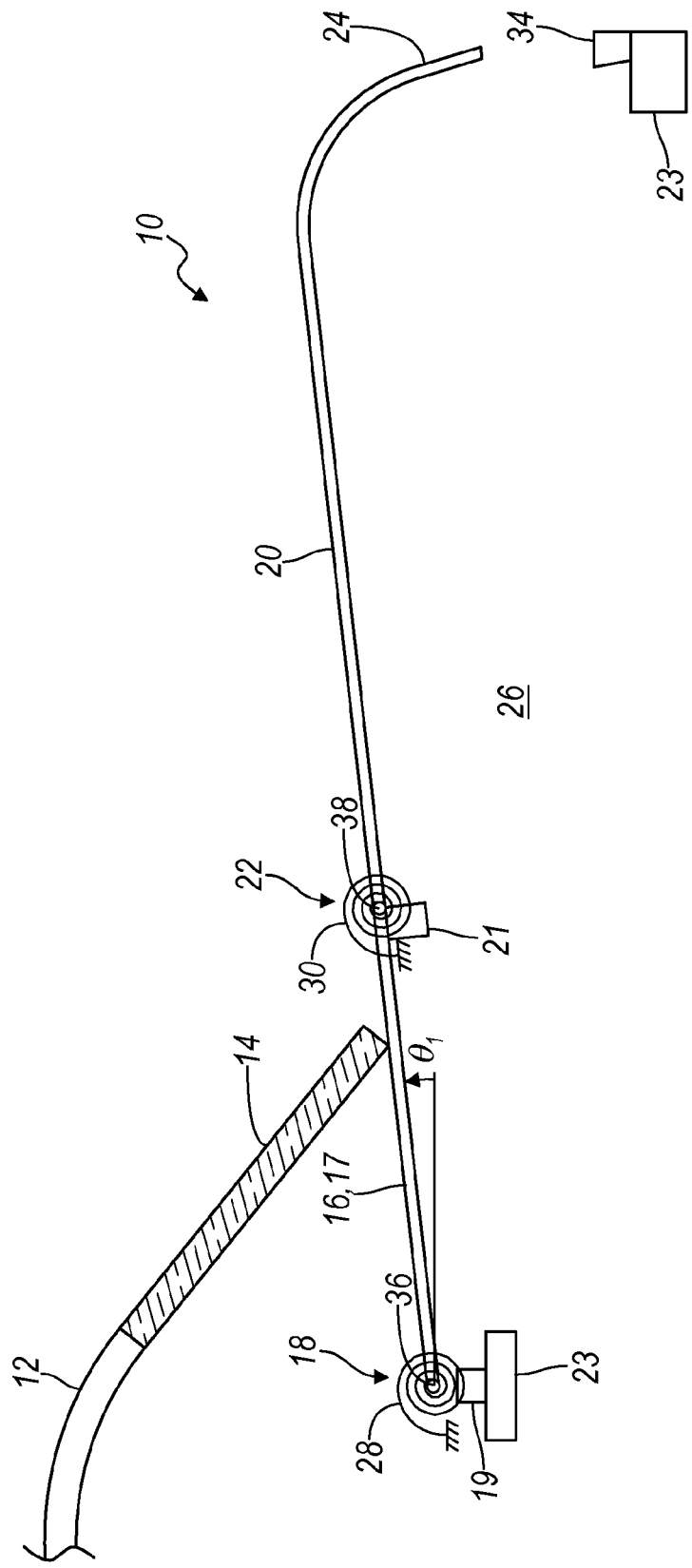
FIG. 2 is schematic side view showing the rear closure panel partially open.

As shown in FIG. 2, the rear closure assembly 10 is partially opened by pivoting the front hinge joints 18 counterclockwise through angle $\theta 1$ to a second reference position. When the rear closure assembly 10 is in the partially open position, front latching mechanisms 19 latch rods 16, 17 and body 23 to panel 20 such that joints 18 are prevented from pivoting counterclockwise further in the direction of angle $\theta 1$. When the rear closure assembly 10 is in the partially open position, rear latching mechanisms 21 maintain rods 16, 17 and body 23 are latched to panel 20 preventing joints 22 from pivoting counterclockwise.

When rods 16, 17 move from the first reference position to the second reference position, contact between the panel assembly 10 with glass panel 14 and the contents of compartment 26 are avoided.

The rear closure panel 10 is opened further to the fully opened position shown in FIG. 3 when the rear latching mechanisms 21 unlatch joints 22 by pivoting the rear hinge joints 22 counterclockwise through angle $\theta 2$ to a third reference position. When the rear closure assembly 10 is in the fully open position, front latching mechanisms 19 maintain rods 16, 17 and body 23 latched to panel 20 such that joints 18 are prevented from pivoting counterclockwise further in the direction of angle $\theta 1$. When the assembly 10 is in fully open position, compartment 26 is fully accessible.

The rear closure panel 10 is moved to the partially closed position when the rear latch mechanisms 21 relatch the rear hinge joints 22 by applying downward force to panel 20 causing the rear hinge joints 22 to pivot clockwise through angle $\theta 2$ to the position shown in FIG. 2.

Thereafter the rear closure panel 10 is moved to the fully closed position when the front latch mechanisms 19 unlatch the front hinge joints 18 by applying downward force to panel 20 causing the front hinge joints 18 to pivot clockwise through angle $\theta 1$ to the reference position of FIG. 1. When the rear closure assembly 10 returns to the closed position, it is releaseably secured to the vehicle body 23 by a latch 34 located at the rear surface of portion 24 of panel 20.

Preferably joints 18 are mutually aligned with a first lateral axis 36 and joints 22 are mutually aligned with a second lateral axis 38, spaced rearward from the first axis. Preferably joints 18, 22 are torsion spring-loaded, latchable hinge joints.

The pivotal joints 18, 22 enable the path of rear closure panel 10 to open without interfering with the vehicle body, rear glass 14 or the contents of compartment 26.

While certain embodiments of the present invention have been described in detail, those familiar with the art to which this invention relates will recognize various alternative designs and embodiments for practicing the invention as defined by the following claims.

What is claimed is:

1. A closure assembly for a vehicle having a vehicle body and a rear glass panel with a rear edge, comprising:
    a rod having a forward end located forward of the rear edge of the glass panel and a rearward end located rearward of the rear edge of the glass panel, the rod extending essentially straight from the forward end to the rearward end;
    a first joint pivotally securing the forward end of the rod to the vehicle body forward of the read edge of the glass panel, the first joint able to pivot about a first laterally oriented axis through a first angle between a first reference position and a second reference position;
    a panel having a forward end and a rearward end; and
    a second joint pivotally securing the forward end of the panel to the rearward end of the rod, the second joint located rearward of the rear edge of the glass panel, and the second joint able to pivot about a second laterally oriented axis, through a second angle between the first reference position and a third reference position, the first laterally oriented axis spaced from the second laterally oriented axis.

2. The closure assembly of claim 1, wherein pivotal displacement of the first joint about the first laterally oriented axis is limited to the first angle.

3. The closure assembly of claim 1, further comprising a first latch that prevents pivotal displacement of the first joint past the second reference position.

4. The closure assembly of claim 1, further comprising a first latch that is unlatched permitting the first joint to pivot from the second reference position to the first reference position.

5. The closure assembly of claim 1, further comprising a second latch that permits pivotal displacement of the second joint about the second laterally oriented axis to the second angle.

6. The closure assembly of claim 1, wherein the second angle is greater than the first angle.

7. The closure assembly of claim 1, further comprising a second latch that latches the panel to the rod when the second joint pivots from the third reference position to the second reference position.

8. The closure assembly of claim 1, further comprising a second latch that latches the panel to the rod while the first joint pivots from the first reference position to the second reference position.

9. A closure assembly for a vehicle having a vehicle body and a rear glass panel with a rear edge, comprising:
    a rod having a forward end located forward of the rear edge of the glass panel and a rearward end located rearward of the rear edge of the glass panel, the rod extending essentially straight from the forward end to the rearward end;
    a first joint pivotally securing the forward end of the rod to the vehicle body forward of the read edge of the glass panel, the first joint able to pivot about a first axis from a first reference position to a second reference position, the first joint including a first spring configured to elastically resisting pivotal displacement;
    a panel having a forward end and a rearward end; and
    a second joint pivotally securing the forward end of the panel to the rearward end of the rod, the second joint located rearward of the rear edge of the glass panel, and the second joint able to pivot about a second axis from the first reference position to a third reference position, the first axis spaced from the second axis, and the second joint including a second spring configured to elastically resisting pivotal displacement.

10. The closure assembly of claim 9, wherein pivotal displacement of the first joint about the first axis is limited to a first angle.

11. The closure assembly of claim 9, further comprising a first latch that prevents pivotal displacement of the first joint past the second reference position.

12. The closure assembly of claim 9, further comprising a first latch that is unlatched permitting the first joint to pivot from the second reference position to the first reference position.

13. The closure assembly of claim 9, further comprising a second latch that permits pivotal displacement of the second joint about the second axis to a second angle.

14. The closure assembly of claim 9, further comprising a second latch that latches the panel to the rod when the second joint pivots from the third reference position to the second reference position.

15. The closure assembly of claim 9, further comprising a second latch that latches the panel to the rod while the first joint pivots from the first reference position to the second reference position.

16. A closure assembly for a vehicle having a vehicle body and a rear glass panel with a rear edge, comprising:
    a pair of rods, each having a forward end located forward of the rear edge of the glass panel and a rearward end located rearward of the rear edge of the glass panel, each of the rods extending essentially straight from the respective forward end to the respective rearward end;
    a pair of first joints each pivotally securing a respective one of the forward ends of the rods to the vehicle body forward of the read edge of the glass panel, the first joints able to pivot about a first axis through a first angle between a first reference position and a second reference position;
    a pair of first latches, each releasably securing a respective one of the forward ends of the rods against rotation relative to the vehicle body;
    a panel having a forward end and a rearward end;
    a pair of second joints each pivotally securing the forward end of the panel to the rearward ends of the rods, the second joints located rearward of the rear edge of the glass panel, and the second joints able to pivot about a second axis through a second angle between the first reference position and a third reference position, the first axis spaced from the second axis; and
    a pair of second latches, each releasably securing a respective one of the rearward ends of the rods against rotation relative to the forward end of the panel at the second joints.

17. The closure assembly of claim 16, wherein the first latches prevent pivotal displacement of the first joints past the second reference position.

18. The closure assembly of claim 16, wherein the first latches are unlatched permitting the first joints to pivot from the second reference position to the first reference position.

19. The closure assembly of claim 16, wherein the second latches permit pivotal displacement of the second joints about the second axis to the second angle.

20. The closure assembly of claim 16, wherein the second latches latch the panel to the rods when the second joints pivot from the third reference position to the second reference position.

* * * * *